United States Patent
Braasch et al.

(10) Patent No.: US 6,532,680 B2
(45) Date of Patent: *Mar. 18, 2003

(54) FLAT SENSOR, ARRANGEMENT FOR A FLAT SENSOR, AND METHOD FOR COMPENSATING FOR THERMAL DEFORMATIONS

(75) Inventors: Jan Braasch, Altenmarkt (DE); Torsten Günther, Kirchweidach (DE)

(73) Assignee: Dr. Johannes Heidenhain GmbH, Traunreut (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/305,610

(22) Filed: May 5, 1999

(65) Prior Publication Data

US 2002/0178601 A1 Dec. 5, 2002

(30) Foreign Application Priority Data

May 6, 1998 (DE) .......................................... 198 20 005
Feb. 4, 1999 (DE) .......................................... 199 04 472

(51) Int. Cl.⁷ ................................................. G01B 7/16
(52) U.S. Cl. ............................. 33/702; 33/503; 374/141
(58) Field of Search ................................. 374/141, 142, 374/166; 33/503, 702, DIG. 19

(56) References Cited

U.S. PATENT DOCUMENTS 1,985,967 A * 1/1935 Wunsch ....................... 374/115
2,015,838 A * 10/1935 Borden et al. ............... 374/166
3,767,470 A * 10/1973 Hines .......................... 136/225

(List continued on next page.)

FOREIGN PATENT DOCUMENTS

CH        673 893        4/1990
DE        36 33 573 C1        2/1988

(List continued on next page.)

OTHER PUBLICATIONS

Draft International Standard ISO/DIS 230–3, Test code for Machine Tools—Part 3, Determination of Thermal Effects, 1998, pp. 1–39.

(List continued on next page.)

*Primary Examiner*—Diego Gutierrez
*Assistant Examiner*—Lydia M. De Jesús (57) ABSTRACT

To compensate for modules which expand as a function of temperature, the present invention provides for using a flat sensor having special structural components that feature temperature-dependent electrical conductivity over the entire length to be measured. The benefit derived is that the temperature is measured over the entire sensor. The structural components are interconnected into tracks, and linked to electronics integrated on the sensor. On its rear side, the sensor has an adhesive layer, enabling it to be simply adhesively mounted on the component to be measured. The manner in which the structural components are distributed, makes it possible to adjust the sensor to any desired length, simply by trimming it. After the sensor is mounted, a protective layer is adhesively applied thereto, as a protective measure. Moreover, sensors of this kind are arranged in accordance with the present invention on machine-tool parts which deform, to determine the temperature that is significant for dimensional accuracy. In this context, the sensors are positioned in parallel to the thermal deformation direction to be expected. By properly selecting these sensors, one can reduce the number of required sensors, as compared to known methods heretofore. An additional benefit derived from these sensors is the fact that only simple, linear calculations are required to precisely compensate for thermal deformations in the machine tool. The determined compensation signals are subsequently fed to position control loops of the machine tool.

26 Claims, 3 Drawing Sheets

U.S. PATENT DOCUMENTS

| | | | | |
|---|---|---|---|---|
| 4,189,605 A | * | 2/1980 | Rich et al. | 562/438 |
| 4,808,048 A | | 2/1989 | Miller | |
| 4,955,380 A | * | 9/1990 | Edell | 128/635 |
| 5,001,842 A | * | 3/1991 | Wright et al. | 33/702 |
| 5,031,331 A | * | 7/1991 | Herzog et al. | 33/503 |
| 5,523,953 A | | 6/1996 | Araie et al. | |
| 5,623,857 A | * | 4/1997 | Sakuraba | 82/1.11 |
| 5,833,407 A | * | 11/1998 | Senda | 409/131 |
| 6,123,675 A | * | 9/2000 | Kreizman et al. | 600/549 |
| 6,167,634 B1 | * | 1/2001 | Pahk et al. | 33/702 |
| 6,269,284 B1 | * | 7/2001 | Lau et al. | 700/193 |

FOREIGN PATENT DOCUMENTS

| | | | | |
|---|---|---|---|---|
| DE | 40 28 006 A1 | | 3/1992 | |
| DE | 694 09 315 T2 | | 7/1998 | |
| EP | 555796 A1 | * | 8/1993 | 700/196 |
| EP | 0 349 783 | | 12/1993 | |
| EP | 0 349 783 B1 | | 12/1993 | |
| EP | 0620424 | | 10/1994 | |
| EP | 641 624 | | 3/1995 | |
| WO | 8802096 | * | 3/1988 | 33/702 |

OTHER PUBLICATIONS

Reto Gruber et al., "Temperatureinflusse auf die Werkzeug–maschinen–Genauigkeit" (The Effects Of Temperature On Machine Tool Accuracy), published in Werkstatt und Betrieb, Ed. 131 (1998) 11. Mentioned in specification.

* cited by examiner

FLAT SENSOR, ARRANGEMENT FOR A FLAT SENSOR, AND METHOD FOR COMPENSATING FOR THERMAL DEFORMATIONS

FIELD OF THE INVENTION

The present invention relates to a flat sensor for measuring temperature and/or expansion, to a special adaptation case for a sensor, to a use of a sensor, to an arrangement for compensating for thermal deformations using sensors, as well as to a method for performing the compensation.

RELATED TECHNOLOGY

European Patent No. EP 349 783 B1 discloses determining machine-tool temperatures in order to define their temperature-dependent expansion and to compensate therefor. The entire temperature variation over the expanding machine part is determined, in this context, for the temperature-dependent expansion. For this, one uses a resistor which extends in the direction of expansion of the machine part and features an intensive thermal contact with the machine part. The resistor used produces an output signal that is proportional to the average temperature and, thus, to the total expansion. For the contacting, suitable contact elements are provided at both ends of the resistor.

Here the drawback is that a separate resistor is needed for each required length. In addition, interference effects, such as deterioration due to ageing, which influence resistance and corrupt the measuring result, are not compensated.

The article, "Temperatureinflüsse auf die Werkzeugmaschinen-Genauigkeit" (The Effects of Temperature on Machine Tool Accuracy) by Reto Gruber and Wolfgang Knapp, published in "Werkstatt und Betrieb" (Workshop and Operation), edition 131 (1998) 11, discloses that the warming of a machine tool results in deformations and, thus, in inaccuracies. Therefore, the new ISO/DIS 230-3 testing standard provides for determining thermal deformations in a machine tool to assess its accuracy. A warming of this kind essentially takes place during machine tool operation, in which, in particular, the spindle's stationary mount heats up, the result being that the heat is conducted from there into the entire machine tool.

The above mentioned article merely discusses the problem and the test provided in ISO/DIS 230-3 for qualitatively determining thermal deformations.

SUMMARY OF THE INVENTION

An object of the present invention is to provide a sensor which avoids the mentioned disadvantages, and which can be used universally and produced cost-effectively. In addition, an aim is to provide a simple method for individually adapting the sensor to specific circumstances. Moreover, the present invention can provide a sensor arrangement for detecting a temperature distribution which causes a deformation in the machine tool, preferably using a minimum number of sensors. This arrangement should be able to be used universally and produced cost-effectively. In addition, the intention is to delineate a simple method for compensating for thermal deformations by utilizing the output signals from the arrangement.

The present invention provides a flat sensor for measuring temperature and/or expansion, in particular of a machine part, or of a length-measuring device or of an angular-position measuring device, comprising at least one structural component (ST1, ST2, ST3) having temperature-dependent electrical conductivity, the structural components (ST1, ST2, ST3) being uniformly distributed over the entire length of the sensor (S). The sensor is characterized in that at least two tracks (SP1, SP2, SP3, SP4, SP5, SP6), which include interconnected structural components (ST1, ST2, ST3), are provided.

Advantageous further features of the sensor may include that: (a) the structural components (ST3) of a track (SP5, SP6) are connected in series; (b) between the two structural components (ST3) is an electrical connection element (VE), which can be used to interconnect the two tracks (SP5, SP6); (c) a soldered point (LP) is provided as an electrical connection element (VE) for the two tracks; (d) the structural components (ST1, ST2) of one track (SP1, SP2, SP3, SP4) are connected in parallel; (e) the at least two tracks (SP1, SP2, SP3, SP4) are made up of at least two different materials; (f) an adhesive layer (KS) is provided on the rear side of the sensor (S) for adhesively mounting it on a component part to be measured, and that the adhesive layer (KS) is especially thermally conductive; (g) a protective layer is adhesively applied to the front side of the sensor (S) in its mounted state, protecting the sensor (S) from damage; (h) the sensor (S) contains electronic modules (V, AW); (i) the electronic modules contain an amplifier circuit (V); (j) the electronic modules contain an evaluation circuit (AW); (k) the sensor (S) has four tracks (SP1, SP2, SP3, SP4), the structural components (ST1) of the two tracks (SP1, SP4) being manufactured from a first material, and the structural components (ST2) of the two tracks (SP2, SP3) from a second material; and/or (l) the four tracks (SP1, SP2, SP3, SP4) in the evaluation circuit (AW) are interconnected into a bridge.

The present invention also provides a method for individually adapting a flat sensor, characterized in that a length of the sensor (S) that is no longer needed is cut along a trim line (SL) at the end of the sensor (S) which does not have any electronic modules (V, AW). Advantageously, the method may also provide that: (a) at the end of the sensor (S) which does not have any electronic modules (V, AW), the two tracks (SP5, SP6) are interconnected by electrical connection elements (VE, LP); (b) the sensor (S) is manufactured in the form of a long band, enabling the user to trim the long band to the required sensor length; and /or (c) the user connects electronic components (V, AW) to the sensor (S) via already existing connection elements (VE, LP).

The present invention further provides an application of the sensor characterized in that the sensor (S) is used for measuring an expansion, and that the longitudinal direction of the tracks (SP1, SP2, SP3, SP4, SP5, SP6) of the sensor (S) are arranged essentially orthogonally to the expansion to be measured.

The present invention also provides an arrangement for compensating for thermal deformations in machine tools using temperature sensors (7.1, 7.2, 7.3, 7.4) for measuring temperature at at least one machine part (3, 4, 5), characterized in that at those machine parts (3, 4, 5), which heat up during operation and which define the distance between the tool and the platen (1), temperature sensors (7.1, 7.2, 7.3, 7.4) are provided, and at those machine parts (3, 4) having a longitudinal extension, elongated temperature sensors (7.1, 7.2, 7.3) are provided, which are aligned in parallel to the expected deformation direction.

The arrangement advantageously may include that: (a) at least one point-shaped temperature sensor (7.4) is arranged at one stationary mount (5) of a spindle of the C-type machine tool; (b) at a cantilever arm (4) of the C-type machine tool, at least one elongated temperature sensor (7.4) is arranged in parallel to the Y-axis, which covers at least a large portion of the extent of the cantilever arm (4) in parallel to the Y-axis; (c) arranged at one frame (3) of the C-type machine tool, in parallel to the Z-axis, is it least one elongated temperature sensor (7.1, 7.2), which covers at least a large portion of the extent of the frame (3), in parallel to the Z-axis; (d) the temperature sensors (7.1, 7.2, 7.3, 7.4) are connected to the machine parts (3, 4, 5) via a connection featuring good thermal conductivity; (e) the temperature sensors (7.1, 7.2, 7.3, 7.4) are linked to an evaluation unit; and/or (f) a protective layer is applied to the temperature sensors (7.1, 7.2, 7.3, 7.4), protecting the temperature sensors (7.1, 7.2, 7.3, 7.4) from damage and from thermal irradiation.

The present invention provides yet further a method for compensating for thermal deformations on machine tools, in which average temperatures of the individual machine parts (3, 4, 5) are calculated from the output signals from the integrating temperature sensors (7.1, 7.2, 7.3); from the average temperatures, thermal deformations in the machine tool are calculated for each axis using linear equations; and compensation signals are produced for position control of the individual axes.

In accordance with the present invention, the sensor is made up of a plurality of tracks, each having interconnected structural components with temperature-dependent electrical conductivity. In this context, the different tracks are composed of at least two different materials, each of whose conductivity varies in its temperature dependence. In the case of a four-track sensor, it is also advantageous that, even in response to a linear deformation, no new adjustment is required in the evaluation electronics. The output signals from the sensor are independent of length.

A benefit of the method of the present invention is the fact that the parallel connection of the structural components results in the resistor elements being uniformly distributed, with temperature-dependent conductivity, over the entire length of the sensor, making it possible for the sensor to be trimmed quite easily to the required length. As a result, one attains the additional benefit that the temperature is advantageously measured over the entire sensor length.

In accordance with the present invention, the temperature-compensation arrangement is made up of a plurality of elongated temperature sensors, which are mounted on those machine tool parts which, in response to a deformation, effect a relative displacement between the tool and the workpiece of the machine tool. The elongated temperature-sensor structure enables one to determine and compensate for any deformation in the geometric dimensions of the machine tool caused by thermal deformation, merely by using a few temperature sensors, so that the operating result cannot be degraded by the temperature fluctuations. Due to the fact that the temperature distribution is integrated over the entire sensor surface, in those machine-tool components which cause a displacement between the workpiece and the tool, the displacement can be determined very precisely, without having to calculate complicated machine-tool and/or temperature-distribution models. It is advantageous that only simple linear calculations are needed to compensate for the thermal deformation. Using the elongated temperature sensor eliminates the need for considering the thermal distribution as a function of time. In addition, only one single temperature sensor is needed to measure the expansion of the machine tool's cantilever arm.

BRIEF DESCRIPTION OF THE DRAWINGS

Other advantages as well as details pertaining to the sensor according to the present invention, the arrangement according to the present invention, as well as to the method according to the present invention are revealed in the following description of exemplary embodiments, on the basis of the drawings, in which.

DETAILED DESCRIPTION

In the following first exemplary embodiment according to FIGS. 1 to 4, one starts out from an application of the sensor according to the present invention as a temperature sensor, and the sensor per se is initially described.

Figure 1:
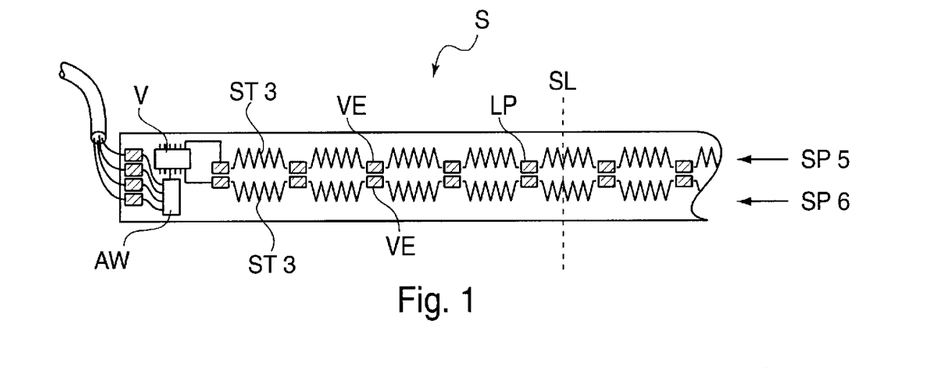
FIG. 1 shows a first embodiment of the flat sensor according to the present invention, including two tracks of structural components connected in series, and evaluation electronics.

FIG. 1 depicts a flat temperature sensor S to be adhesively mounted on the surface of a machine part, whose thermal expansion needs to be determined. Sensor S includes a first track SP5, which includes series-connected structural components ST3 having a temperature-dependent electrical conductivity. The individual structural components ST3 are linked via connection elements in the form of soldered pads VE, arranged between each of the two structural components ST3. Second track SP6 is identical in design to the first, and is arranged so as to be adjacent to first track SP5.

Also arranged on the side having the lead-in wire (i.e., the supply lead) are electronic modules, which perform an amplification V and/or evaluation AW of the output signal from sensor S.

For the most part, the length of sensor S exceeds the length required by the user. In this case, the user can simply cut sensor S to length, removing any length that is not needed along a trim line SL. This is essentially done orthogonally to tracks SP5 and SP6. In this particularly user-friendly and simple manner, the length of sensor S can be adjusted by the user. It is an important consideration in this context that a temperature measurement be taken only along the length of sensor S having structural components ST3, and not along the length of sensor S having electronic modules V and AW.

The two connection elements VE now located at the end of sensor S are to be bridged by a soldered point LP or by another electrically conductive connection, as shown in FIG. 1.

Figure 2:
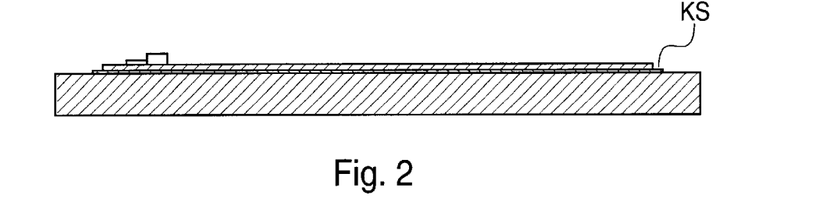
FIG. 2 shows a longitudinal section through a flat sensor according to the present invention, including evaluation electronics.

Sensor S is secured to the machine part using the thermally conductive adhesive layer KS, as shown in FIG. 2, on the rear side of sensor S. Preciment can advantageously be used as an adhesive layer KS.

There is also the possibility of applying a protective layer to sensor S, for example by adhesively applying a film of suitable thickness and strength to sensor S. This provides protection, for example, from mechanical or chemical damage.

Figure 3:
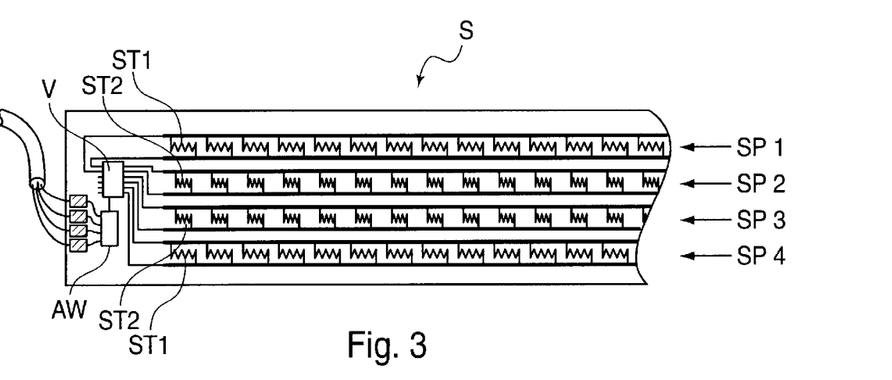
FIG. 3 shows a second embodiment of the flat sensor according to the present invention, including four tracks of structural components connected in parallel, with evaluation electronics.

FIG. 3 shows an alternative embodiment of flat sensor S according to the present invention. Provision is made for four tracks SP1 through SP4, first and fourth track SP1 and SP4, and second and third track SP2 and SP3 each being made up of a parallel connection of structural components ST1 and ST2 over the entire sensor length. In this context, at least structural components ST1 and ST2 should be composed of material whose electrical conductivity varies in its dependency on temperature. The output signals from all tracks SP1, SP2, SP3 and SP4 are initially fed to an evaluation circuit AW, where the output signal paths are interconnected in a bridge, in particular a Wheatstone bridge, the output signals from the bridge circuit being subsequently fed to an amplifier V.

The electronic modules required in this context for amplifier V and evaluation AW can be designed as integrated modules on sensor S, as shown in FIG. 3. This makes it possible to lessen the sensitivity to electromagnetic disturbances and to the unavoidable noise.

In contrast to a point-by-point temperature measurement, for example using individual temperature-dependent resistors, the flat sensor supplies the precise average value of the temperature in the range covered by the sensor. Since, given a constant expansion coefficient, the total expansion is proportional to the average temperature, temperature measurements taken at previous points in time, as required by other methods, are not needed when sensor S in accordance of with the present invention is used.

The temperature-dependent ohmic resistance of a metallic conductor, as used for structural components ST1, ST2, and ST3, is calculated from the specific resistance $\rho$ of the material, length L, cross-sectional surface A, temperature coefficient $\alpha$ and temperature difference $\Delta T$.

$$R = \rho \cdot \frac{L}{A} \cdot (1 + \alpha \cdot \Delta T)$$

If one starts out from the assumption that the broad, horizontal wiring paths of any desired track SP1, SP2, SP3, SP4 from FIG. 1, or connection elements VE of tracks SP5 or SP6 from FIG. 3, do not have any influence on the total resistance of a structural component ST1, ST2, or ST3, then the resistance of a track SP1, SP2, SP3, SP4, SP5 or SP6 can be calculated from the parallel connection of the individual structural components ST1, ST2, or from the series connection of structural components ST3. The more interesting parallel connection of structural components ST1 and ST2 of FIG. 3 used as temperature-dependent resistors will be discussed in greater detail in the following. Given a number n of structural components ST1, ST2, the resistance of one of tracks SP1, SP2, SP3, SP4 is calculated as:

$$R = \rho \cdot \frac{L}{n \cdot A} \cdot (1 + \alpha \cdot \Delta T)$$

The average temperature can be measured quite advantageously using the flat sensor of FIG. 3, when the four tracks SP1, SP2, SP3 and SP4 are interconnected in a Wheatstone bridge. In this manner, the bridge circuit is used to compensate for disturbances.

If R1 through R4 designate the resistors of tracks SP1 through SP4, it then applies for the bridge circuit that:

$$U_a = U_e \cdot \left[ \frac{R2}{R1 + R2} - \frac{R4}{R3 + R4} \right]$$

In the Wheatstone bridge, R1 and R2 form a first voltage divider, and R3 and R4 a second, parallel-connected voltage divider. Output voltage Ua is measured as a potential difference between the connection points of R1, R2 and R3, R4. Supply voltage $U_e$ is fed to R1 and R3; R2 and R4 are connected to ground.

If for structural components ST1 and ST2, one uses different materials having different characteristics and one assigns index a to the characteristics of structural components ST1, and index b to the characteristics of structural components ST2, then output voltage $U_a$ of the bridge circuit is expressed as a function of input voltage $U_e$ by the formula:

$$\frac{U_a}{U_e} = \frac{\rho_a \cdot \frac{L_a}{n \cdot A_a} \cdot (1 + \alpha_a \cdot \Delta T)}{\rho_a \cdot \frac{L_a}{n \cdot A_a} \cdot (1 + \alpha_a \cdot \Delta T) + \rho_b \cdot \frac{L_b}{n \cdot A_b} \cdot (1 + \alpha_b \cdot \Delta T)} -$$

$$\frac{\rho_b \cdot \frac{L_b}{n \cdot A_b} \cdot (1 + \alpha_b \cdot \Delta T)}{\rho_b \cdot \frac{L_b}{n \cdot A_b} \cdot (1 + \alpha_b \cdot \Delta T) + \rho_a \cdot \frac{L_a}{n \cdot A_a} \cdot (1 + \alpha_a \cdot \Delta T)}$$

Assuming in simplified terms that
- temperature coefficient $\alpha_b$ is negligibly small as compared to $\alpha_a$;
- all structural components ST1 and ST2 have the same resistance at room temperature; and
- the temperature-dependent change in resistance is small as compared to the total resistance, it applies that:

$$U_a = U_e \cdot \left[ \frac{\rho_a \cdot \frac{L_a}{A_a} \cdot \alpha_a \cdot \Delta T}{\rho_a \cdot \frac{L_a}{A_a} + \rho_b \cdot \frac{L_b}{A_b}} \right] = U_e \cdot \left[ \frac{\rho_a \cdot \frac{L_a}{A_a} \cdot \alpha_a}{\rho_a \cdot \frac{L_a}{A_a} + \rho_b \cdot \frac{L_b}{A_b}} \right] \cdot \Delta T$$

A negligibly small temperature coefficient $\alpha_b$ of the material for first structural components ST1, as compared to temperature coefficient $\alpha_a$, is achieved by properly selecting the materials which make up structural components ST1 and ST2. Particularly suited for this is the combination of constantan having temperature coefficient $\alpha_b$ for structural components ST1 and copper having temperature coefficient $\alpha_a$ for structural components ST2. By properly selecting length La, Lb and cross-section Aa, Ab, the same resistance at room temperature will be achieved for all structural components ST1 and ST2. It holds true in any case that the change in the temperature-dependent portion of the resistance is small as compared to the total resistance, since temperature coefficient $\alpha_a$ and $\alpha_b$ are small as compared to 1.

Thus, as expressed by the above equation, the bridge voltage is independent of the number n of structural components ST1 and ST2 remaining after the sensor is trimmed. This eliminates the need for the user to specially calibrate amplifier V as a function of the length of sensor S.

When sensor S according to the present invention is used as a strain-sensing element, the so-called preferential directions of structural components ST1, ST2, ST3 of tracks SP1, SP2, SP3 and SP4 of the sensor of FIG. 3, or SP5 and SP6 of the sensor of FIG. 1, must not be aligned orthogonally to the expansion direction. An optimum sensitivity of sensor S to the expansion is achieved by configuring tracks SP1 through SP4, or SP5 and SP6 to run in parallel to the expansion direction. The reason for this is given by the special wiring arrangement in structural components ST1, ST2 and ST3 in accordance with FIGS. 1 and 3.

In the preceding description, it is assumed that the electronic modules are arranged as integrated modules on sensor S, at least for purposes of amplifying the sensor output signals. Alternatively, the electronic modules and actual sensor S, including only tracks SP1 through SP4, or SP5 and SP6, may be designed as separate modules in accordance with FIG. 4. It is then advantageously possible for sensor S to be manufactured in large one-piece quantities, and not be trimmed, e.g. from a roller or spool, until needed for a special application.

Figure 4:
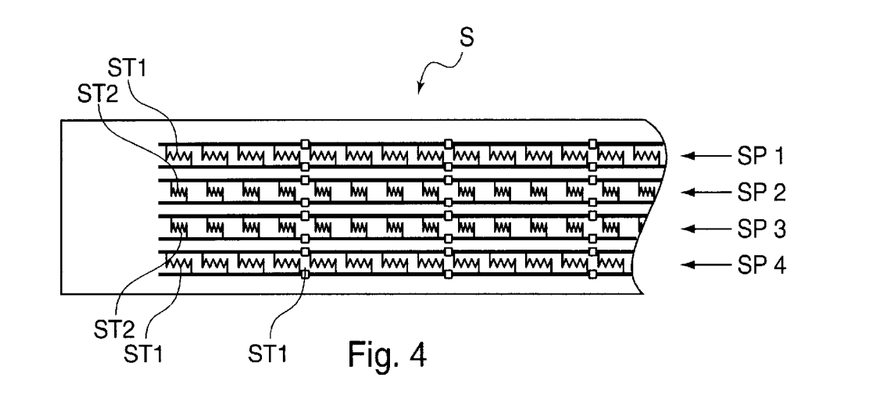
FIG. 4 shows another embodiment of the flat sensor according to the present invention, including four tracks of structural components connected in parallel.

Here one would derive the benefit of not producing any waste material and of a substantially simpler and more cost-effective manufacturing of sensor S.

The electronic modules, in particular amplifier V, can then either be connected via cables to sensor S, or conductively connected to sensor S directly at one end of tracks SP1 through SP4 or SP5 and SP6. For this, connection elements VE shown in FIG.1 or, as depicted in FIG. 4, the broad wiring paths, which connect in parallel structural components ST1 and ST2, can be used for connecting sensor S of FIG. 3. In the case that the wiring-path width does not suffice for contacting, then, as shown in FIG. 4, additional soldered points LP can be provided at regular intervals for connecting sensor S to evaluation electronics (V, AW).

In the following second exemplary embodiment, in accordance with FIGS. 5 to 7b, an application of the temperature sensor in accordance with the present invention is assumed for compensating for thermal deformations when working with a vertical machine tool. However, an application in machining centers or for other machine tools having a similar structure is likewise possible.

Figure 5:
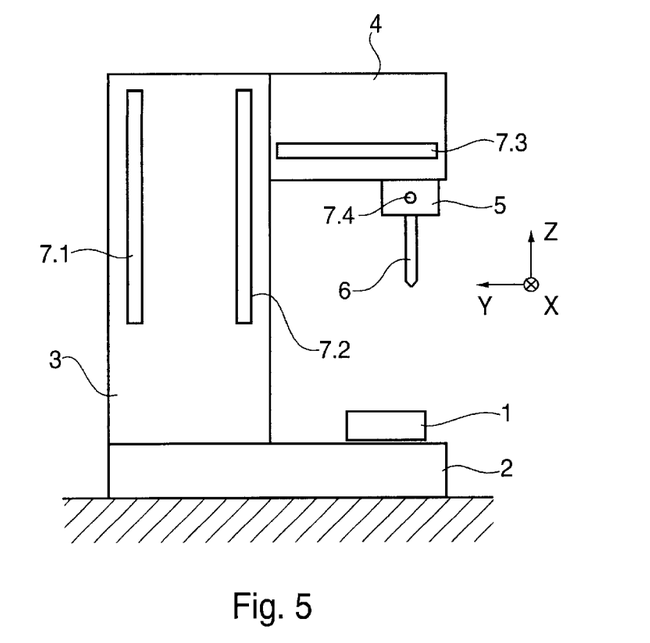
FIG. 5 shows a first embodiment of the arrangement according to the present invention in the case of a C-type machine tool at reference temperature.

FIG. 5 depicts an arrangement according to the present invention of elongated temperature sensors 7.1, 7.2, and 7.3, as well as of a point-shaped temperature sensor 7.4 on a vertical machine-tool. The machine tool in FIG. 5 is shown at reference temperature. Based on the structure of the machine, which includes bench 2 with platen 1, frame 3, and cantilever arm 4, and which has a C-shape, the vertical machine tool shown counts among the so-called C-type machines. In this type of machine, thermal deformations in the structure occur for the most part in response to the unavoidable warming that occurs during operation in the spindle's stationary mount 5. This warming progresses with increasing machining time and spindle speed. Therefore, HSC spindles, in particular, having rotational speeds of 100,000 rpm and more, show evidence of thermal deformations with increasing operating time.

That heat produced in stationary mount 5 during operation is conducted through the machine structure via cantilever arm 4 to frame 3. As a rule, bench 2 and platen1 are no longer substantially heated, since bench 2 is a coupled to the foundation, from where heat is dissipated. Moreover, it takes a relatively long time for the heat produced in stationary mount 5 to be conducted to bench 2. As a result, all of the machine components no longer exhibit the same temperature; instead, there is an irregular distribution of temperature in the machine. Since the machine components are usually made of metallic materials, the heat is conducted efficiently, and the individual machine components exhibit a temperature-dependent expansion.

Between platen 1, upon which the workpiece to be machined is clamped and which is virtually no longer reached by the heat of stationary mount 5, and the workpiece's point of contact 6, the so-called tool-center-point TCP, with the tool, a shifting or displacement takes place due to the thermal deformation of the machine structure. This cannot be compensated by existing measuring systems, since when working with a movable platen, these measuring systems measure the movement of platen1 in relation to bench 2. A displacement of point of contact 6 relative to platen 1 and, thus, to the workpiece is not considered in disclosed methods heretofore.

In accordance with the present invention, temperature sensors 7.1, 7.2, 7.3 and 7.4 are provided at those machine components which heat up during operation of the machine tool and which determine the relative position of point of contact 6 to platen 1. This makes it possible, on the basis of temperature, to determine a thermal deformation of those machine components relevant to the relative position of point of contact 6 to platen 1, and to compensate for this deformation.

In the case of a C-type machine, temperature sensors 7.1, 7.2, 7.3, 7.4 are placed in this context at stationary mount 5, at cantilever arm 4, and at frame 3.

By way of temperature sensors 7.1, 7.2, 7.3, 7.4, a voltage is output in each case, which varies in proportion to the temperature of temperature sensors 7.1, 7.2, 7.3, 7.4. Therefore, the temperature can be calculated from the output voltage of temperature sensors 7.1, 7.2, 7.3, 7.4, under consideration of an offset value and of a proportionality constant. In this context, the evaluation electronics used for the calculation can be integrated both in the temperature sensor in question, as well as implemented separately.

A reference temperature To required in the following can be set as desired, quite advantageously, in such a way that in response to reference temperature To, to the extent that is possible, all temperature sensors 7.1, 7.2, 7.3 and 7.4 show an output voltage of 0 volts. In this manner, absolute temperature sensors 7.1, 7.2, 7.3 and 7.4 are realized, whose output signal has no output-voltage offset value that needs to be considered.

As soon as the entire machine tool exhibits this reference temperature, for example due to a period of residence in a climatic chamber, various machine-tool dimensions, needed for the following calculations, are determined very precisely. These are:

The distance LS between the spindle end, where the tool is clamped, and the thermal fixed point of the spindle in the direction of the Z-axis. In this context, the thermal fixed point is defined as the point from where the spindle deforms in response to a temperature change in the direction of the ±Z-axis.

The length LA of cantilever arm 4 in the direction of the Y-axis between the thermal fixed point of the spindle and the beginning of frame 3.

The lever arm HA of cantilever arm 4. This is determined from the distance segment in the direction of the Y-axis between the thermal fixed point of the spindle and the point of rotation about which cantilever arm 4 turns in response to a thermal deformation of frame 3.

The distance LT between the two temperature sensors 7.1 and 7.2 mounted on frame 3.

The dimensional size LGz of frame 3 in the direction of the Z-axis.

These measured quantities merely need to be defined once to determine reference values, and then stored.

Temperature sensor 7.2 measures temperature Tz of frame 3 on the side facing cantilever arm 4, and temperature sensor 7.1 measures temperature Ta of frame 3 on the side facing away from cantilever arm 4. Due to the not insignificant width of frame 3 and the temperature variation in the machines structure during operation, it is necessary to calculate the deformations of frame 3 for the side facing and for the side facing away from cantilever arm 4. The thermally produced deformation ΔZz for the side of frame 3 facing cantilever arm 4 or ΔZa for the side of frame 3 facing away from cantilever arm 4 in the direction of the Z-axis is calculated in accordance with equation (1a) and (1b) from the product of the temperature deviation from the reference temperature with the expansion coefficients of the frame material, multiplied by the length of frame 3 LG in the direction of the Z-axis, as expressed by:

$$\Delta Zz = (Tz - To) * \text{expansion coefficient} * LGz \quad (1a)$$

$$\Delta Za = (Ta - To) * \text{expansion coefficient} * LGz \quad (1b)$$

Temperature sensor 7.3 measures temperature T of cantilever arm 4 essentially between the thermal fixed point of the spindle and frame 3. From the product of the temperature difference between measured temperature T and reference temperature To, and the expansion coefficient of the cantilever-arm material, multiplied by the length LA of cantilever arm 4 in the direction of the Y-axis, the deformation of cantilever arm 4 in the direction of the Y-axis is calculated in accordance with equation (2):

$$\Delta Y = (T - To) * \text{expansion coefficient} * LA \quad (2)$$

In conventional operation, the temperature of stationary mount 5 of the spindle is determined by the point-shaped temperature sensor 7.4. It is assumed, in this context, that stationary mount 5 is the only heat source of importance to the thermal deformation. On the basis of temperature T determined by temperature sensor 7.4, the deformation between the thermal fixed point and the spindle end, where the tool is clamped, parallel to the Z-axis, is expressed by equation (3) as:

$$\Delta Zs = (T - To) * \text{expansion coefficient} * LS \quad (3)$$

The spindle expansion that occurs in response to a heating in the -Z-direction is thus calculated from the temperature difference between a reference temperature To and the current temperature T, multiplied by the expansion coefficient of the spindle material and the distance LS between the spindle end and the thermal fixed point of the spindle.

In addition, the position of the spindle end of the C-type machine tool is shifted by the thermal deformation of frame 3. A non-uniform deformation of frame 3 shifts cantilever arm 4, not only in the direction of the Z-axis by ΔZa in accordance with equation 1b, but also turns it about the X-axis. This likewise leads to a shifting of point of contact 6 between the tool and the workpiece. From the sum of ΔZa and the product of lever arm HA of cantilever arm 4 and the difference in the expansions ΔZz and ΔZa of frame 3, divided by distance LT between temperature sensors 7.1 and 7.2 at frame 3, displacement ΔZv in the direction of the Z-axis is calculated in accordance with equation (4):

$$\Delta Zv = \Delta Za + HA * (\Delta Zz - \Delta Za) / LT \quad (4)$$

Therefore, from the displacement of the spindle in the direction of the -Z-axis, one subtracts a displacement of the spindle caused by a deformation of frame 3, yielding a total resulting deformation in the Z-axis direction, as expressed by equation (5):

$$\Delta Z = \Delta Zs - \Delta Zv \quad (5)$$

In this manner, the thermally produced deformation can be defined quite simply, on an individual basis for the Y- and Z-axis (due to its symmetry to the X-axis, a C-type machine tool exhibits virtually no thermal deformation parallel to the X-axis), on the basis of the machine-part temperatures determined using temperature sensors 7.1 through 7.4. The calculations required in accordance with equations (1a) through (5) for compensation of the thermal deformation are performed in an evaluation unit, and the compensation signals determined in this manner for the individual axes are fed to the position controller for the axis in question. It is beneficial that the numerical control already provided for each machine-tool can also be used as an evaluation unit, since the new calculation in accordance with uncomplicated equations (1a) through (5) is performed only in relatively long time intervals, such as one minute.

Figure 6:
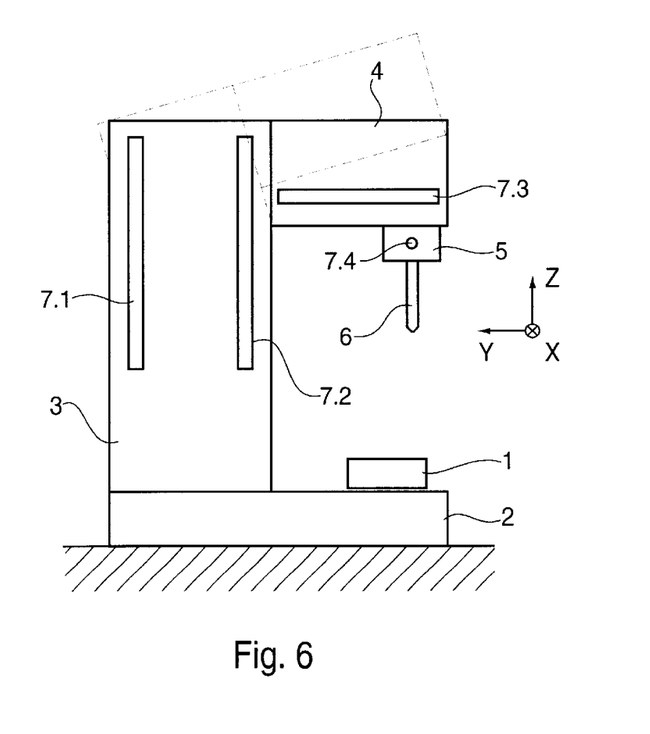
FIG. 6 shows a C-type machine tool of FIG. 5, which has warmed up due to heat being generated in the stationary mount.

FIG. 6 illustrates a C-type machine-tool after approximately six hours of mostly uninterrupted operating time. Due to the heat produced in stationary mount 5, which is conducted from stationary mount 5 via cantilever arm 4 to frame 3, the machine components exhibit a temperature gradient unequal to zero and, accordingly, deform to varying degrees.

Figure 7A:
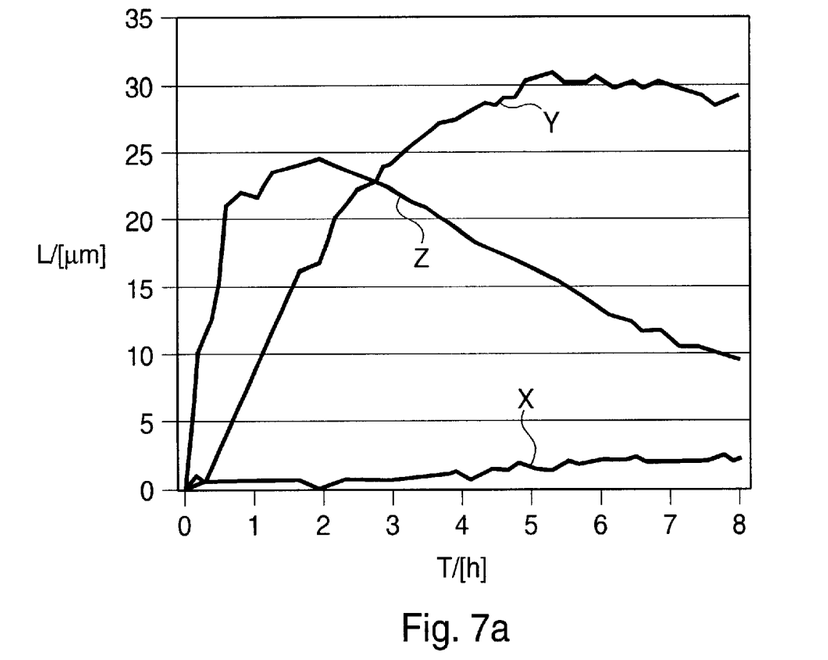
FIG. 7a shows the deformation of the axes as a function of the operating time of a C-type machine tool, without compensation.

One possible qualitative deformation of the machine-tool, without any compensation in accordance with the present invention, is depicted in FIG. 7a for the individual axes. The graphically illustrated measurements are performed in accordance with ISO/DIS 230-3. On the basis of the reference temperature, at which there is no deformation in any of the three axes X, Y or Z, the spindle motor was put in operation, and the relative displacement L between a spindle end and a fixed point on the machine's sliding carriage was measured. In the process, the spindle motor rotated at about 6000 rpm.

In the X-axis direction, one can discern merely a displacement L of less than 5 μm. For the most part, the reason for this is the symmetrical structure of the C-type machine tool with respect to the X-axis. In principle, however, the present invention also make it possible to compensate for deformations in the machine tool parallel to the X-axis. This would require at least one elongated temperature sensor parallel to the Y-axis in the YZ-plane, at the two sides of frame 3 exhibiting a difference in temperature.

With increasing operating time, the rising temperature of cantilever arm 4, caused by heat generated in stationary mount 5, broadens displacement L in the Y-axis direction up to approximately 30 μm, thus substantially lengthening cantilever arm 4. Displacement L in the Z-axis direction varies relatively significantly over the entire time period under consideration, since the spindle is initially deformed in its length, and then—due to the irregular heating of frame 3—cantilever arm 4, together with the spindle, is deformed upwards. After eight hours operating time, the resulting displacement L still has not reached any stationary state, as can be inferred from FIG. 7a.

This means that in a high-precision parts manufacturing, it is necessary to permanently re-adjust the machine tool, since displacement L plotted in FIG. 7a between the spindle end and platen 1 has a direct effect on the product.

Figure 7B:
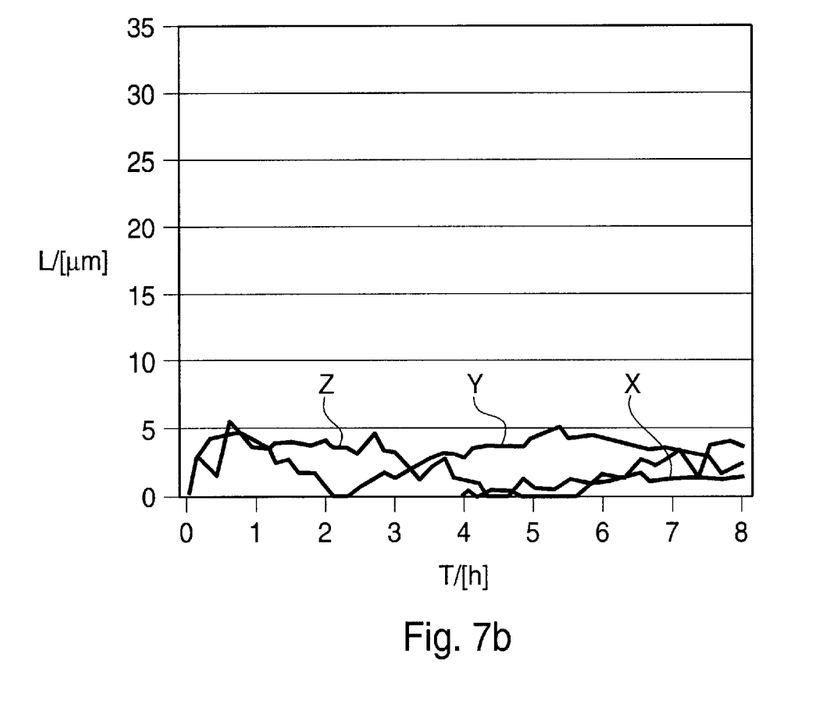
FIG. 7b shows the deformation of the axes as a function of the operating time of a C-type machine tool, with compensation.

FIG. 7b depicts the same operation shown in FIG. 7a (quasi-permanent operation of the spindle motor at 6,000 rpm). The deformations calculated using the arrangement and the method according to the present invention are compensated, however, for example by superimposing the compensation signal onto a position controller or a positional precontrol. One can recognize that the displacements L still remaining in all axes following the compensation according to the present invention are reduced to a range of approximately 0 to 5 μm. This eliminates the need for permanently re-adjusting the machine tool, which would otherwise entail considerable outlay in a manufacturing.

What is claimed is:

1. A machine tool with compensation for thermal deformation during an operation comprising:
   a bench with a platen for mounting a workpiece;
   a frame arranged on said bench;
   a cantilever arm arranged on said frame so that a C-shape results from the arrangement of said bench, said frame and said cantilever arm;
   a stationary mount being arranged on said cantilever arm, wherein a tool for processing said workpiece is arranged in said stationary mount;
   said frame and said cantilever arm heat up during the operation so that a length of said frame is changed in a deformation direction and a length of said cantilever arm is changed in a deformation direction; and
   a plurality of temperature sensors for measuring temperature over an extended portion of each of said frame, said cantilever arm, and said stationary mount, wherein said temperature sensors are mounted to said frame and said cantilever arm, said sensors configured to be elongated and aligned parallel to said deformation direction so that said temperature sensors supply an average value of the temperature in a range covered by said temperature sensors.

2. The machine tool as recited in claim 1, wherein said machine tool further comprises at least one point-shaped temperature sensor arranged on said stationary mount.

3. The machine tool as recited in claim 1, wherein the temperature sensors are connected to said frame and said cantilever arm via a thermally conductive connection.

4. The machine tool as recited in claim 1 further comprising an evaluation unit linked to said plurality of temperature sensors.

5. The machine tool as recited in claim 1 further comprising a protective layer over said temperature sensors.

6. A machine tool with compensation for thermal deformation comprising:
   a bench with a platen for mounting a workpiece;
   a stationary mount, wherein a tool for processing said workpiece being arranged in said stationary mount;
   said platen and said stationary mount being connected by a plurality of machine parts;
   said machine parts heating up during operation so that lengths of said machine parts are changed in respective deformation directions;
   a plurality of temperature sensors for measuring over an extended portion of each of said machine parts, wherein said temperature sensors are mounted to said machine parts, said sensors elongated and aligned parallel to said respective deformation directions so that temperature sensors supply an average value of the temperature in the range covered by said temperature sensors.

7. The machine tool according to claim 6, wherein each of the plurality of temperature sensors is a flat sensor comprising:
   at least a first and a second track, the first and second tracks including interconnected structural components, the structural components having temperature dependent electrical conductivity and being uniformly distributed over an entire length of the sensor.

8. The machine tool as recited in claim 7, wherein the structural components of at least the first track are connected in series.

9. The machine tool as recited in claim 7, further comprising an electrical connection element between two structural components for interconnecting the first and second tracks.

10. The machine tool as recited in claim 9, wherein the electrical connection element is a soldered point.

11. The machine tool as recited in claim 7, wherein the structural components of at least the first track are connected in parallel.

12. The machine tool as recited in claim 7, wherein the structural components of the first and second tracks include at least two different materials.

13. The machine tool as recited in claim 7, wherein the flat sensor further comprises an adhesive layer on a rear side of the sensor for adhesively mounting the sensor to at least one of the certain machine parts, the adhesive layer being thermally conductive.

14. The machine tool as recited in claim 7, further comprising a protective layer adhesively applied to a front side of the sensor so as to protect the sensor.

15. The machine tool as recited in claim 7, further comprising electronic modules connected at least to the first track.

16. The machine tool as recited in claim 15, wherein the electronic modules include an amplifier circuit.

17. The machine tool as recited in claim 15, wherein the electronic modules contain an evaluation circuit.

18. The machine tool as recited in claim 7, further comprising a third and a fourth track having further structural components, the structural components of the first and second tracks being manufactured from a first material, and the further structural components from a second material.

19. The machine tool as recited in claim 18, wherein the first, second, third and fourth tracks are interconnected into a bridge.

20. The machine tool as recited in claim 6, wherein said machine parts comprising:
   a frame, which is arranged on said bench and
   a cantilever arm being arranged on said frame so that there results the shape of a C from the arrangement of said bench, said frame and said cantilever arm.

21. The machine tool as recited in claim 20, wherein at least one of the plurality of said temperature sensors being arranged in parallel to the length direction of said cantilever arm and said at least one of the plurality of said temperature sensors covers at least a portion of said cantilever arm.

22. The machine tool as recited in claim 20, wherein at least one of the plurality of said temperature sensors being arranged in parallel to the length direction of said frame and said at least one of the plurality of said temperature sensors covers at least a portion of said frame.

23. The machine tool as recited in claim 6, wherein said machine tool further comprises at least one point-shaped temperature sensor arranged on said stationary mount.

24. The machine tool as recited in claim 6, wherein the temperature sensors are connected to said machine parts via a thermally conductive connection.

25. The machine tool as recited in claim 6 further comprising an evaluation unit linked to said plurality of temperature sensors.

26. The machine tool as recited in claim 6 further comprising a protective layer over said temperature sensors.

* * * * *